(12) United States Patent
Lin et al.

(10) Patent No.: US 9,804,294 B2
(45) Date of Patent: Oct. 31, 2017

(54) OPTICAL FILM AND AUTOSTEREOSCOPIC 3D DISPLAY USING THE SAME

(71) Applicant: AU Optronics Corporation, Hsin-Chu (TW)

(72) Inventors: Yi-Hsin Lin, Hsin-Chu (TW); Pen-I Liao, Hsin-Chu (TW); Cheng-Ming Liu, Hsin-Chu (TW); Cheng-Wei Huang, Hsin-Chu (TW); Wen-Lung Chen, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 352 days.

(21) Appl. No.: 14/492,268

(22) Filed: Sep. 22, 2014

(65) Prior Publication Data
US 2015/0124185 A1    May 7, 2015

(30) Foreign Application Priority Data

Nov. 7, 2013 (TW) .............................. 102140533 A

(51) Int. Cl.
G02B 1/04 (2006.01)
G02B 27/22 (2006.01)
H04N 13/04 (2006.01)

(52) U.S. Cl.
CPC .......... *G02B 1/041* (2013.01); *G02B 27/2214* (2013.01); *H04N 13/0404* (2013.01)

(58) Field of Classification Search
CPC .. G02B 27/26; G02B 27/2214; G02B 27/041; G02B 1/041; H04N 13/0404
(Continued)

(56) References Cited

U.S. PATENT DOCUMENTS 9,482,873 B2 * 11/2016 Lin ........................... G02F 1/29
2012/0075540 A1    3/2012 Chen et al.
(Continued)

FOREIGN PATENT DOCUMENTS

CN    201156112 Y    11/2008
CN    103226247 A    7/2013
(Continued)

OTHER PUBLICATIONS

Office Action issued in corresponding Taiwan application dated Jul. 14, 2015.
(Continued)

*Primary Examiner* — Dung Nguyen
(74) *Attorney, Agent, or Firm* — McClure, Qualey & Rodack, LLP

(57) ABSTRACT

An optical film and an autostereoscopic 3D display using the same are provided. The optical film includes a concave lens layer and a birefringence layer. The concave lens layer has plurality of concaves and a presumed refractive index. The birefringence layer overlaps the concave lens layer and includes a plurality of liquid crystal units filled and cured in the concaves. The birefringence layer has a short axis refractive index. The presumed refractive index is between 100.1%-102.8% of the short axis refractive index. The autostereoscopic 3D display includes the optical film, a liquid crystal switch module, and a display panel module. The liquid crystal switch module is disposed on one side of the optical film. The display panel module is disposed on one side of the liquid crystal switch module opposite to the optical film and has a display surface facing the liquid crystal switch module. Image light generated by the display panel module can pass through the optical film after its polarization direction is modulated by the liquid crystal switch module.

18 Claims, 7 Drawing Sheets

(58) Field of Classification Search
USPC .................................... 359/489.14, 489.18
See application file for complete search history.

(56) References Cited

U.S. PATENT DOCUMENTS

| | | | |
|---|---|---|---|
| 2013/0250426 A1 | 9/2013 | Hattori et al. | |
| 2013/0271837 A1* | 10/2013 | Zhou ................... | G02B 5/1833 359/566 |
| 2014/0176833 A1* | 6/2014 | Wu ........................ | G02B 27/26 349/15 |
| 2015/0185487 A1* | 7/2015 | Lee ....................... | G02F 1/1336 349/15 |

FOREIGN PATENT DOCUMENTS

| | | | |
|---|---|---|---|
| TW | 201213867 A | 4/2012 | |
| TW | 201234054 A | 8/2012 | |
| TW | 103226247 A | 7/2013 | |
| WO | 2012176709 A1 | 12/2012 | |

OTHER PUBLICATIONS

Office Action issued in corresponding China application dated Dec. 15, 2015.

* cited by examiner

OPTICAL FILM AND AUTOSTEREOSCOPIC 3D DISPLAY USING THE SAME

BACKGROUND OF THE DISCLOSURE

1. Field of the Disclosure

This disclosure generally relates to an optical film and an autostereoscopic 3D display using the same. More specific, this disclosure relates to an optical film using localized 2D/3D switchable cylindrical lens technique and an autostereoscopic 3D display using the same.

2. Background

In recent years, following with the progress of display technology, customers' demand on displays' displaying quality (e.g., image resolution, color saturation, etc.) is getting higher. However, besides high image resolution and high color saturation, whether a display is capable of displaying 3D images is also an important consideration to the customers.

There are many techniques available to a display for displaying 3D images. Among these techniques, localized 2D/3D switchable cylindrical lens technique has been gradually emphasized since autostereoscopic 3D can be achieved, i.e. the customers can watch 3D images without wearing 3D glasses. The technique makes a concave lens layer having a light emitting axis parallel to a polarizing film by rubbing process, fills liquid crystals into the concave lens layer, and then cures to form a birefringence layer after rubbing. A liquid crystal switch module is also provided to control the direction of a light axis by applying voltage. When no voltage is applied to the liquid crystal switch module, the direction of the light axis deflects 90 degrees with respect to the light emitting axis of the polarizing film of the display panel after it passes the liquid crystal switch module. When a voltage is applied to the liquid crystal switch module, the liquid crystals change their orientation; the direction of the light axis remains parallel to the light emitting axis of the polarizing film of the display panel. The direction of the light axis is changed to change the refractive index of the birefringence layer by using the liquid crystal switch module, and therefore a refractive index difference with respect to a presumed refractive index of birefringence layer is produced to switch between 2D/3D modes.

However, deflection and focalization shifting may occur when the presumed refractive index of the birefringence layer and the short axis refractive index of the birefringence layer are not matched, wherein overlapped fence shape fringe interference images, i.e. Moire pattern, would be produced. The existence of Moire pattern seriously affects the displays' displaying quality.

SUMMARY

In accordance with aspects of the present disclosure, an optical film and an autostereoscopic 3D display using the same are provided.

The optical film includes a concave lens layer and a birefringence layer. The concave lens layer has a plurality of concaves. The concave lens layer has a presumed refractive index. The birefringence layer overlaps the concave lens layer and includes a plurality of liquid crystal units filled and cured in the concaves. The birefringence layer has a short axis refractive index and a long axis refractive index. The presumed refractive index is between 100.1%-102.8% of the short axis refractive index.

The concave lens layer is formed by curing a resin, wherein the composition of the concave lens layer includes a monomer combination, a photo initiator, an additive (e.g., defoaming agent), and a polyester acrylate. The weight percent of the monomer combination based on the total weight of the concave lens layer is between 30 wt % and 80 wt %. The weight percent of the photo initiator based on the total weight of the concave lens layer is between 0.5 wt % and 20 wt %. The weight percent of the additive based on the total weight of the concave lens layer is between 1 wt % and 25 wt %. The weight percent of the polyester acrylate based on the total weight of the concave lens layer is between 5 wt % and 50 wt %, wherein the solution type refractive index of the polyester acrylate is between 80%-120% of the short axis refractive index.

The monomer combination includes a first monomer, wherein the solution type refractive index of the first monomer is between 100%-140% of the short axis refractive index. The monomer combination includes a second monomer, wherein the solution type refractive index of the second monomer is between 60%-100% of the short axis refractive index. The birefringence layer has a long axis refractive index, wherein the presumed refractive index is smaller than the long axis refractive index. The width of the concave is between 120 μm-600 μm. The depth of the concave is between 20 μm-150 μm.

The autostereoscopic 3D display of the present invention includes the optical film described above, a liquid crystal switch module, and a display panel module. The liquid crystal switch module is disposed on one side of the optical film, wherein the polarization direction of a light passing through the liquid crystal switch module can be controlled by applying voltage on the liquid crystal switch module to change the orientation of liquid crystals within the liquid crystal switch module. The display panel module is disposed on one side of the liquid crystal switch module opposite to the optical film and has a display surface facing the liquid crystal switch module, wherein an image light generated by the display panel module passes the optical film after its polarization direction is modulated by the liquid crystal switch module.

In a different embodiment, the autostereoscopic 3D display of the present invention includes the optical film described above and a display panel module. The polarization direction of a light passing through the optical film can be controlled by directly applying voltage on the birefringence layer to change the orientation of liquid crystals within the birefringence layer. The display panel module is disposed on one side of the optical film and has a display surface facing the optical film, wherein the polarization direction of an image light generated by the display panel module can be modulated by the birefringence layer of the optical film.

It is to be understood that the above description and the embodiments below are merely illustrative and are not to be considered limitations to the scope of the invention.

DETAILED DESCRIPTION

Figure 1:
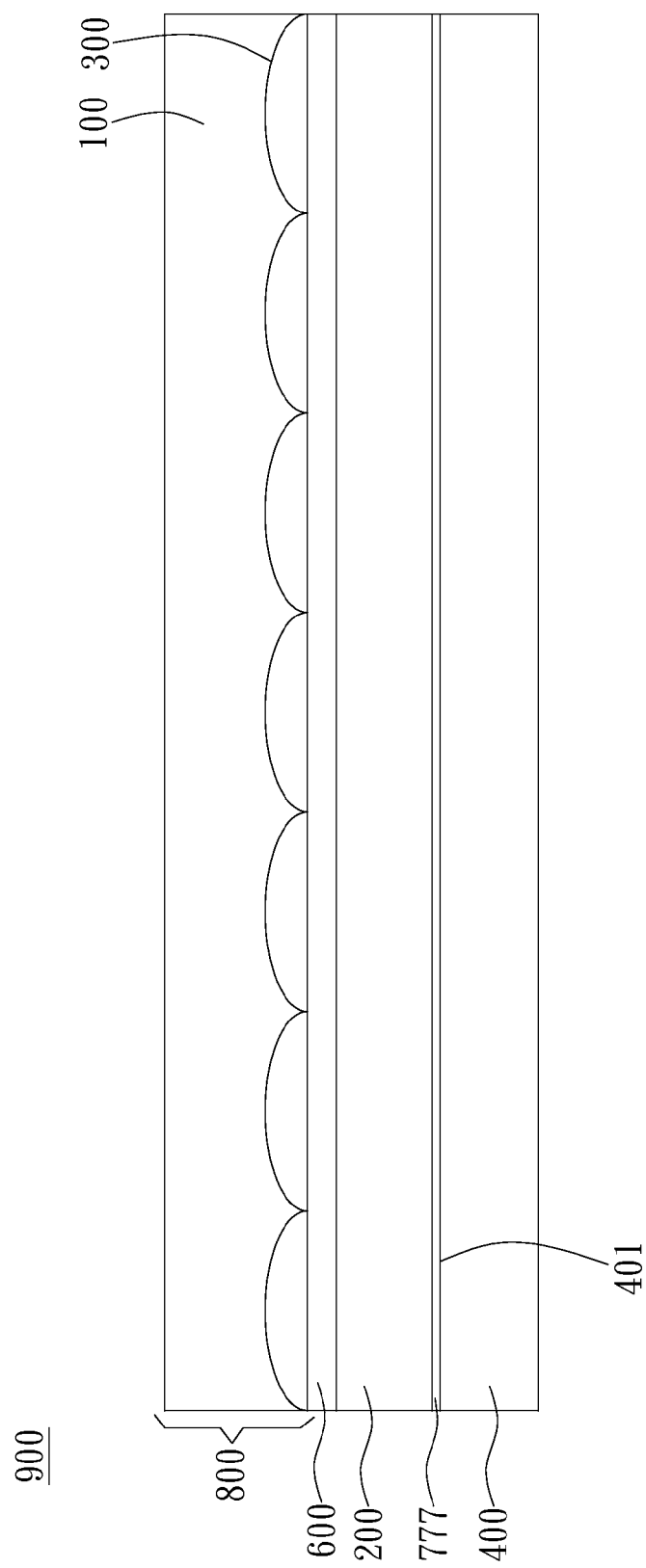
FIG. 1 is a schematic view of an embodiment of the autostereoscopic 3D display of the present invention.

As the embodiment shown in FIG. 1, the autostereoscopic 3D display 900 of the present invention includes an optical film 800, a liquid crystal switch module 200, and a display panel module 400. The liquid crystal switch module 200 is disposed on one side of the optical film 800, wherein the polarization direction of a light passing through the liquid crystal switch module 200 can be controlled by applying voltage on the liquid crystal switch module 200 to change the orientation of liquid crystals within the liquid crystal switch module 200. The display panel module 400 is disposed on one side of the liquid crystal switch module 200 opposite to the optical film 800 and has a display surface 401 facing the liquid crystal switch module 200, wherein an image light generated by the display panel module 400 passes through the optical film 800 after its polarization direction is modulated by the liquid crystal switch module 200. In this embodiment, an optical clear adhesive 600 is further disposed between the optical film 800 and the liquid crystal switch module 200 for adhering the two. A polarizing film 777 can be disposed between the display panel module 400 and the liquid crystal switch module 200.

Figure 2A:
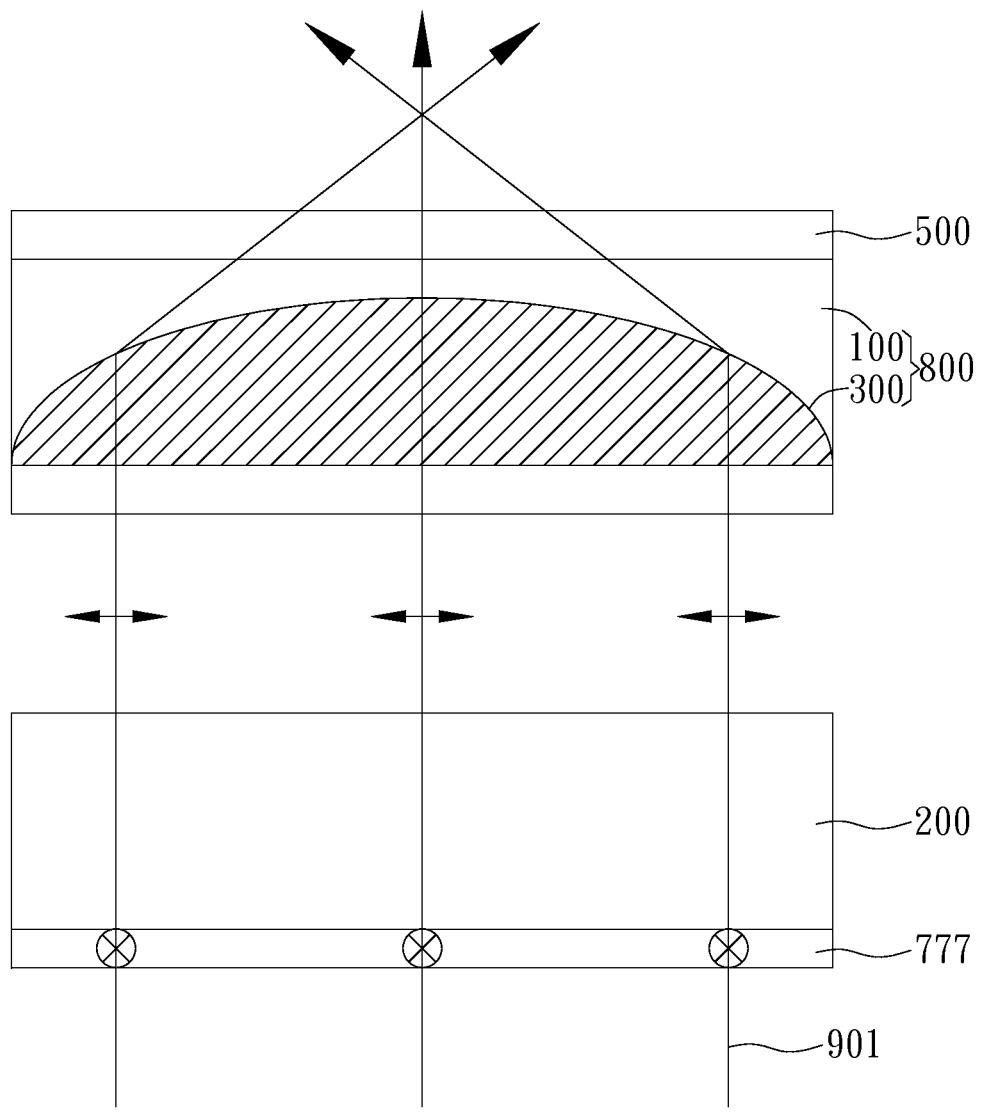
FIGS. 2A and 2B are schematic views of embodiments of the optical film in the autostereoscopic 3D display of the present invention having a fixed birefringence cylindrical lens formed by liquid crystal layer.
Figure 2B:
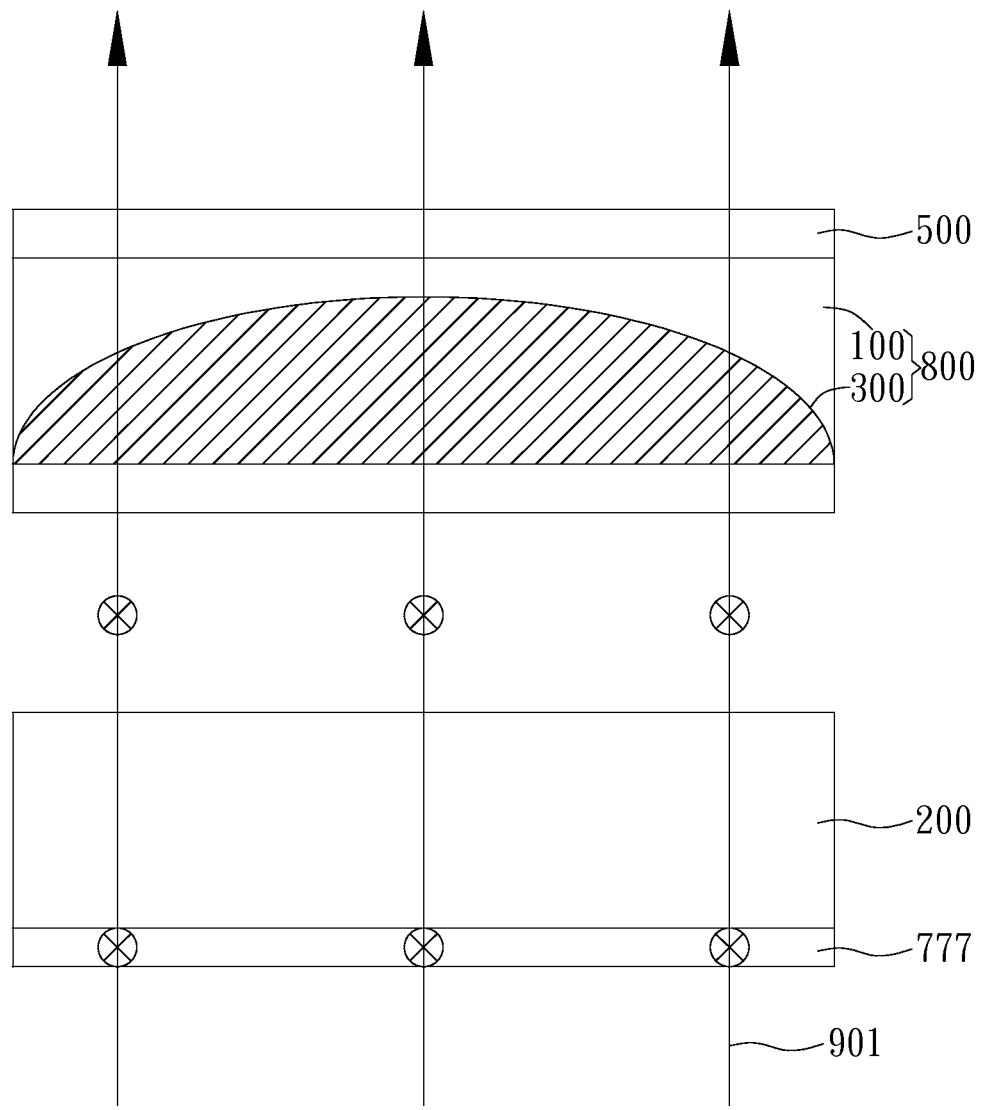

More particularly, in the embodiment shown in FIG. 1, the optical film 800 is preferably a fixed birefringence cylindrical lens formed by a birefringence layer, wherein the structure of the optical film 800 will be discussed in subsequent paragraphs. By using the optical film 800 and the liquid crystal switch module 200, the autostereoscopic 3D display 900 of the present invention controls the advancing direction of the light 901 to accomplish the switching of 2D/3D effect. As shown in FIG. 2A, in this embodiment, under the circumstances that no voltage is applied to the liquid crystal switch module 200 and the rubbing is perpendicular to the light emitting axis of the polarizing film, taking twisted nematic liquid crystal units as an example, assuming that the polarization direction of the incoming light changes from 0 to 90 degrees after passing through the liquid crystal switch module 200, an optical path difference will be produced to change the advancing direction of the light 901 and 3D effect of the cylindrical lens is performed since the refractive index of the birefringence layer in the optical film 800 through which the light passes is different from that of the lens. As shown in FIG. 2B, when a voltage is applied to the liquid crystal switch module 200, the twisted nematic liquid crystal units change their orientation, the polarization direction of the light axis remains 0 degree after passing through the liquid crystal switch module 200, thus the refractive index of the birefringence layer is same with that of the lens when the light passes the optical film 800, 2D effect is performed.

Figure 3A:
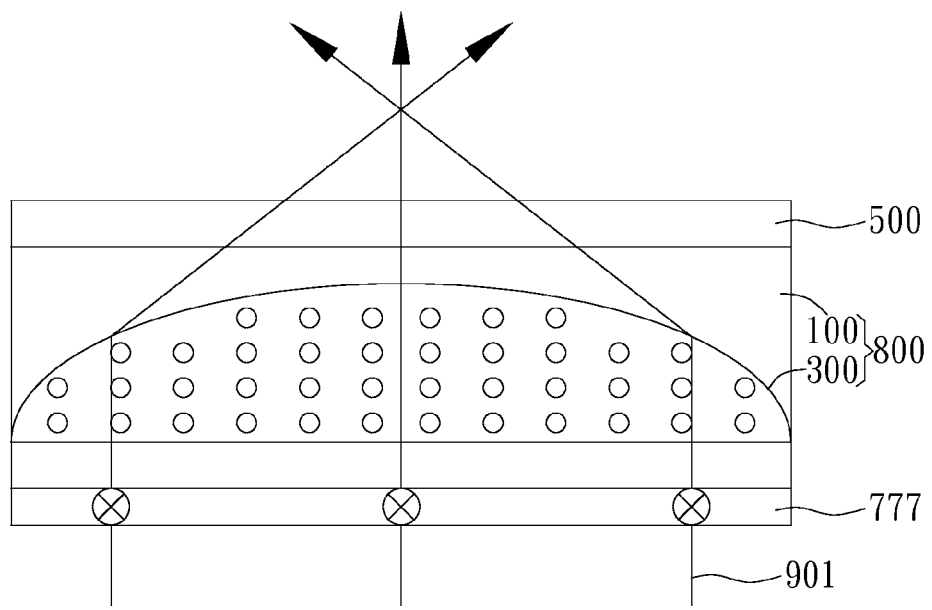
FIGS. 3A and 3B are schematic views of embodiments of the liquid crystal layer of the optical film in the autostereoscopic 3D display of the present invention forming an active 2D/3D switchable lens.

In different embodiments, the birefringence layer of the optical film 800 can form an active 2D/3D switchable lens, wherein the switching of 2D/3D effect can be accomplished by directly applying voltage on the birefringence layer to change its refractive index. As shown in FIG. 3A, under the circumstances that no voltage is applied, an optical path difference will be produced to change the advancing direction of the light and 3D effect of the cylindrical lens is performed since the refractive index of the birefringence layer in the optical film 800 is different from that of the lens.

Figure 3B:
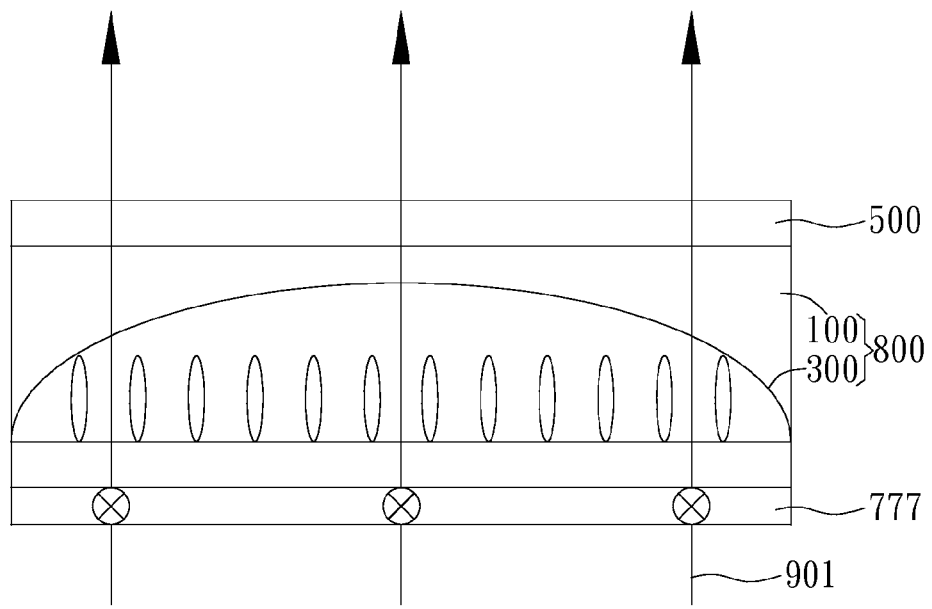
Figure 3C:
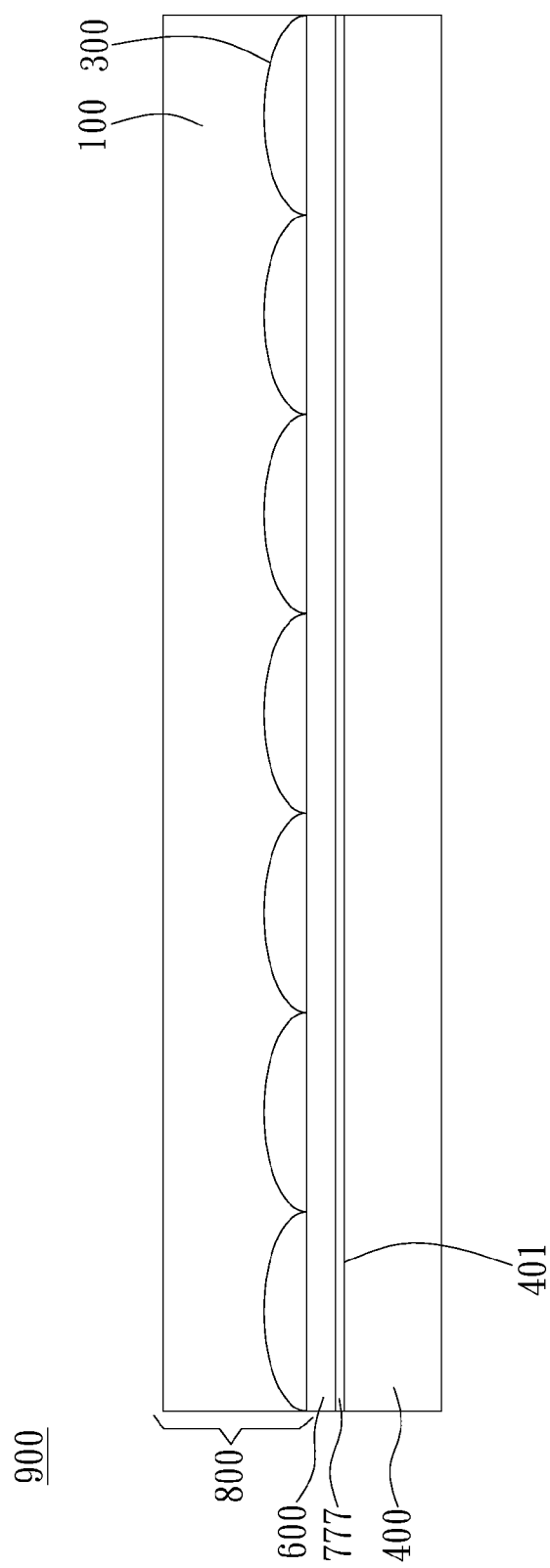
FIG. 3C is a schematic view of a different embodiment of the autostereoscopic 3D display of the present invention.

As shown in FIG. 3B, when a voltage is applied, the twisted nematic liquid crystal units change their orientation, the polarization direction of the light axis remains 0 degree after passing through the optical film 800, thus the refractive index of the birefringence layer is same with that of the lens, the advancing direction of the light remains the same, 2D effect is performed. More specific, as shown in FIG. 3C, the autostereoscopic 3D display 900 includes the optical film 800 and the display panel module 400 disposed on one side of the optical film 800 and having a display surface 401 facing the optical film 800. The polarization direction of a light passing through the optical film 800 can be controlled by directly applying voltage on the birefringence layer 300 to change the orientation of liquid crystals within the birefringence layer 300. The polarization direction of an image light generated by the display panel module 400 can be modulated by the birefringence layer 300 of the optical film 800.

The optical film of the present invention is for generating autostereoscopic 3D images. As the embodiment shown in FIG. 4, the optical film 800 of the present invention includes a concave lens layer 100 and a birefringence layer 300. The concave lens layer 100 has a plurality of concaves 110 and has a presumed refractive index. A plurality of liquid crystal units are filled in the plurality of concaves 110, which are cured and polymerized to form the birefringence layer 300 overlapping the concave lens layer 100. The concaves 110 are preferably thin bars, thus the liquid crystal units 310 filled in the concaves 110 can be cured as thin bars. The birefringence layer 300 has a short axis refractive index and a long axis refractive index. The presumed refractive index is between 100.1%-102.8% of the short axis refractive index. As shown in table 1, 2D Moire pattern is very indistinct under visual observation when the presumed refractive index is between 100.1%-102.8% of the short axis refractive index, which means the display quality of the display is less affected. The birefringence layer has the short axis refractive index and the long axis refractive index corresponding to the short axis and the long axis, respectively.

TABLE 1

| The percentage of the presumed refractive index with respect to the short axis refractive index | 2D Moire pattern |
| --- | --- |
| 99.60% | Distinct |
| 100.10% | Indistinct |
| 100.19% | Indistinct |
| 100.92% | Indistinct |
| 101.32% | Indistinct |
| 102.16% | Indistinct |
| 102.80% | Slightly distinct |

Figure 4:
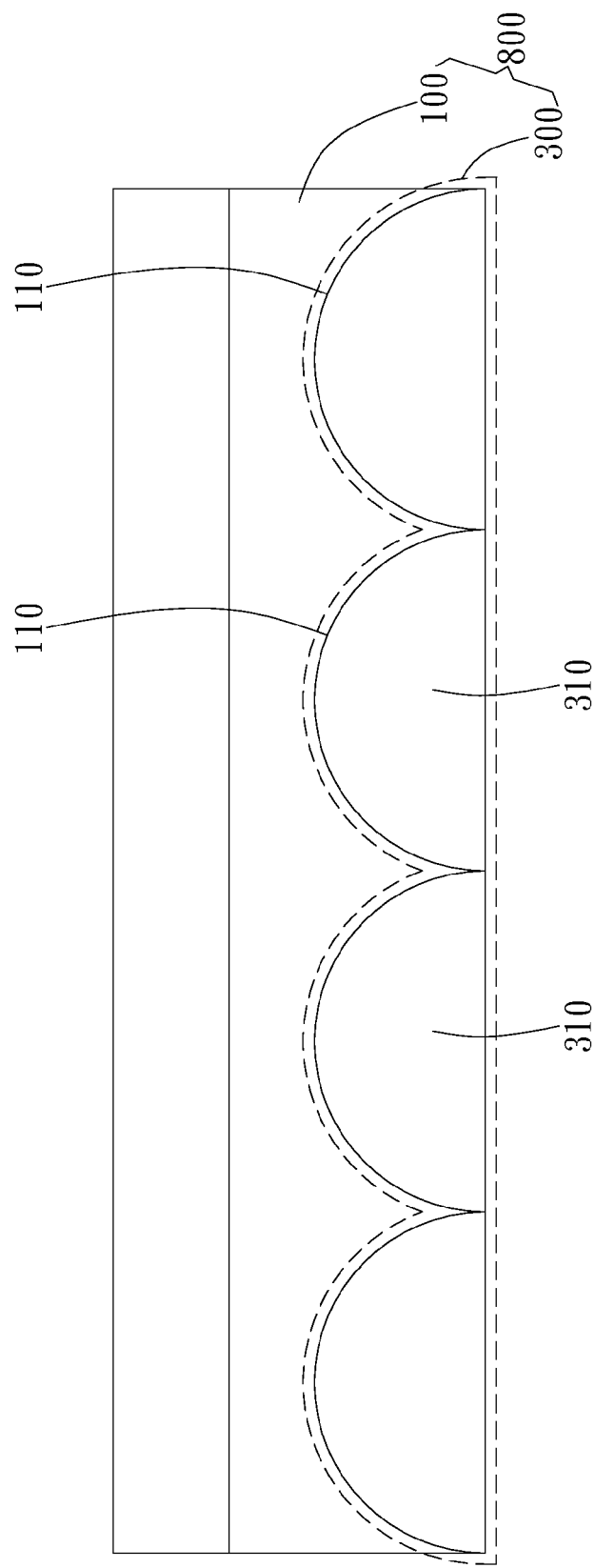
FIG. 4 is a schematic view of an embodiment of the optical film of the present invention.

In the embodiment shown in FIG. 4, the concave 110 is semicircular cylindrical canyon, wherein its cross section is semicircular concave. The width of the concave is preferably between 120 μm-600 μm. The depth of the concave is preferably between 20 μm-150 μm. In different embodiments, however, the concaves 100 can be arc concaves or concaves with other shapes to meet manufacturing or usage considerations. The concave lens layer is formed by curing a resin, wherein the composition of the concave lens layer includes a monomer combination, a photo initiator, and a polyester acrylate, wherein an additive (e.g., defoaming agent) can be further included. In the preferred embodiment, the weight percent of the monomer combination based on the total weight of the concave lens layer is between 30 wt % and 80 wt %; the weight percent of the photo initiator based on the total weight of the concave lens layer is between 0.5 wt % and 20 wt %; the weight percent of the polyester acrylate based on the total weight of the concave lens layer is between 5 wt % and 50 wt %, wherein the solution type refractive index of the polyester acrylate is between 80%-120% of the short axis refractive index. The monomer combination further includes a first monomer, wherein the solution type refractive index of the first monomer is between 100%-140% of the short axis refractive index. The monomer combination further includes a second monomer, wherein the solution type refractive index of the second monomer is between 60%-100% of the short axis refractive index. The birefringence layer has a long axis refractive index, wherein the presumed refractive index is smaller than the long axis refractive index. The compositions are, but not limited to, shown in table 2.

TABLE 2

| group | first monomer (based on total weight) | second monomer (based on total weight) | photo initiator (based on total weight) | polyester acrylate (based on total weight) | additive (based on total weight) |
|---|---|---|---|---|---|
| 1 | 80% | 0 | 15% | 5% | 0 |
| 2 | 0 | 80% | 15% | 5% | 0 |
| 3 | 30% | 0 | 20% | 50% | 0 |
| 4 | 0 | 30% | 20% | 50% | 0 |
| 5 | 48.5% | 0 | 0.5% | 50% | 1% |
| 6 | 0 | 45% | 5% | 25% | 25% |
| 7 | 30% | 25% | 10% | 25% | 10% |
| 8 | 5% | 0 | 20% | 50% | 25% |

More particularly, under the circumstances that the short axis refractive index of the birefringence layer 300 is given, the presumed refractive index of the formed concave lens layer can be made between 100.1%-102.8% of the short axis refractive index of the birefringence layer 300 by adjusting the structure of the concave (e.g., width, depth, shape, etc.) or the composition of the concave lens layer (e.g., the weight percentage of the monomer combination, the photo initiator, and the polyester acrylate). On the other hand, under the circumstances that the presumed refractive index of the formed concave lens layer is given, a birefringence layer 300 having specific short axis refractive index can be used to make the presumed refractive index between 100.1%-102.8% of the short axis refractive index.

Figure 5A:
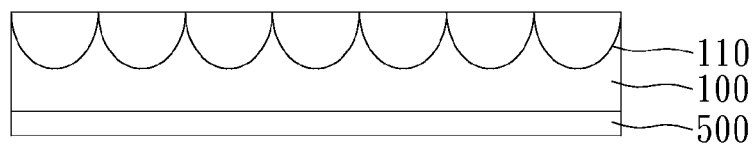
FIGS. 5A to 5C are schematic views of embodiments of manufacturing the optical film of the present invention.
Figure 5B:
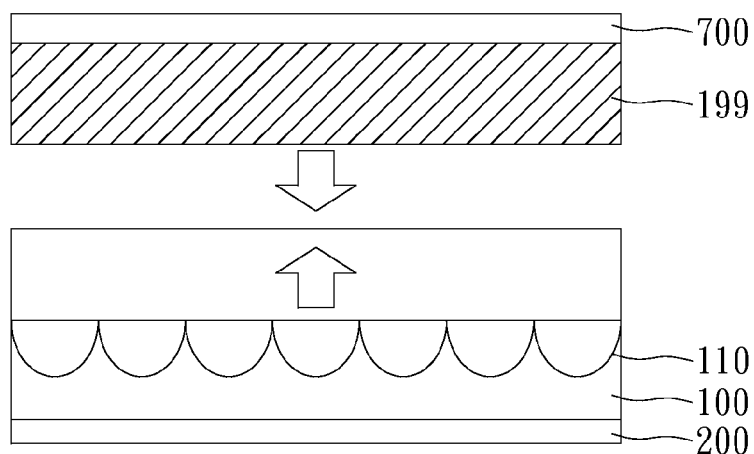
Figure 5C:
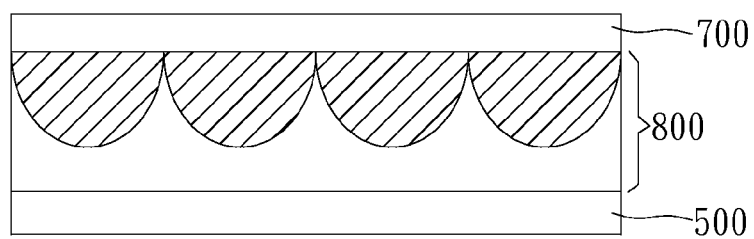

As the embodiments shown in FIGS. 5A-5C, when manufacturing the optical film of the present invention, it is preferred to form a concave lens layer 100 having a plurality of concaves 110 on a film 500 made of materials such as polyethylene terephthalate (PET) first as shown in FIG. 5A. It is preferred to make the presumed refractive index of the formed concave lens layer between 100.1%-102.8% of the short axis refractive index by adjusting the structure of the concaves 110 or the composition of the concave lens layer 100. After that, a liquid crystal layer material 199 is laminated, rubbed, and cured on the concave lens layer 100 to obtain the birefringence layer 300 overlapping the concave lens layer 100, which forms the optical film 800, as shown in FIG. 5C. In the process, the liquid crystal layer material 199 can be disposed on one side of a plate 700 made of materials such as glass in advance for the operation convenience in the manufacturing process.

Although the preferred embodiments of the present disclosure have been described herein, the above description is merely illustrative. Further modification of the disclosure herein disclosed will occur to those skilled in the respective arts and all such modifications are deemed to be within the scope of the disclosure as defined by the appended claims.

What is claimed is:

1. An optical film for generating autostereoscopic 3D images, comprising:
   a concave lens layer having a plurality of concaves and a presumed refractive index; and
   a birefringence layer overlapping the concave lens layer, wherein the birefringence layer includes a plurality of liquid crystal units filled, rubbed, and cured in the concaves;
   wherein the birefringence layer has a short axis refractive index, the presumed refractive index is between 100.1%-102.8% of the short axis refractive index;
   wherein the composition of the concave lens layer includes:
   a monomer combination, wherein the weight percent of the monomer combination based on the total weight of the concave lens layer is between 30 wt % and 80 wt %;
   a photo initiator, wherein the weight percent of the photo initiator based on the total weight of the concave lens layer is between 0.5 wt % and 20 wt %; and
   a polyester acrylate, wherein the weight percent of the polyester acrylate based on the total weight of the concave lens layer is between 5 wt % and 50 wt %, wherein the solution type refractive index of the polyester acrylate is between 80%-120% of the short axis refractive index.

2. The optical film of claim 1, wherein the monomer combination includes a first monomer, wherein the solution type refractive index of the first monomer is between 100%-140% of the short axis refractive index.

3. The optical film of claim 2, wherein the monomer combination includes a second monomer, wherein the solution type refractive index of the second monomer is between 60%-100% of the short axis refractive index.

4. The optical film of claim 1, wherein the birefringence layer has a long axis refractive index, the presumed refractive index is smaller than the long axis refractive index.

5. The optical film of claim 1, wherein the width of the concave is between 120 μm-600 μm.

6. The optical film of claim 1, wherein the depth of the concave is between 20 μm-150 μm.

7. An autostereoscopic 3D display, comprising:
   the optical film of any of claim 1;
   a liquid crystal switch module disposed on one side of the optical film, wherein the polarization direction of a light passing through the liquid crystal switch module can be controlled by applying voltage on the liquid crystal switch module to change the orientation of liquid crystals within the liquid crystal switch module;
   a display panel module disposed on one side of the liquid crystal switch module opposite to the optical film and having a display surface facing the liquid crystal switch module, wherein an image light generated by the display panel module passes through the optical film after its polarization direction is modulated by the liquid crystal switch module.

8. The autostereoscopic 3D display of claim 7, wherein the monomer combination includes a first monomer, wherein the solution type refractive index of the first monomer is between 100%-140% of the short axis refractive index.

9. The autostereoscopic 3D display of claim 8, wherein the monomer combination includes a second monomer, wherein the solution type refractive index of the second monomer is between 60%-100% of the short axis refractive index.

10. The autostereoscopic 3D display of claim 7, wherein the birefringence layer has a long axis refractive index, the presumed refractive index is smaller than the long axis refractive index.

11. The autostereoscopic 3D display of claim 7, wherein the width of the concave is between 120 μm-600 μm.

12. The autostereoscopic 3D display of claim 7, wherein the depth of the concave is between 20 μm-150 μm.

13. An autostereoscopic 3D display, comprising:
   the optical film of any of claim 1, wherein the polarization direction of a light passing through the optical film can be controlled by directly applying voltage on the birefringence layer to change the orientation of liquid crystals within the birefringence layer; and
   a display panel module disposed on one side of the optical film and having a display surface facing the optical film, wherein the polarization direction of an image light generated by the display panel module can be modulated by the birefringence layer of the optical film.

14. The autostereoscopic 3D display of claim 13, wherein the monomer combination includes a first monomer, wherein the solution type refractive index of the first monomer is between 100%-140% of the short axis refractive index.

15. The autostereoscopic 3D display of claim 14, wherein the monomer combination includes a second monomer, wherein the solution type refractive index of the second monomer is between 60%-100% of the short axis refractive index.

16. The autostereoscopic 3D display of claim 13, wherein the birefringence layer has a long axis refractive index, the presumed refractive index is smaller than the long axis refractive index.

17. The autostereoscopic 3D display of claim 13, wherein the width of the concave is between 120 μm-600 μm and the depth of the concave is between 20 μm-150 μm.

18. The autostereoscopic 3D display of claim 13, wherein the depth of the concave is between 20 μm-150 μm.

* * * * *